J. H. SHEPHERD.
PIPE COUPLING.
APPLICATION FILED SEPT. 30, 1910.
1,038,669.
Patented Sept. 17, 1912.
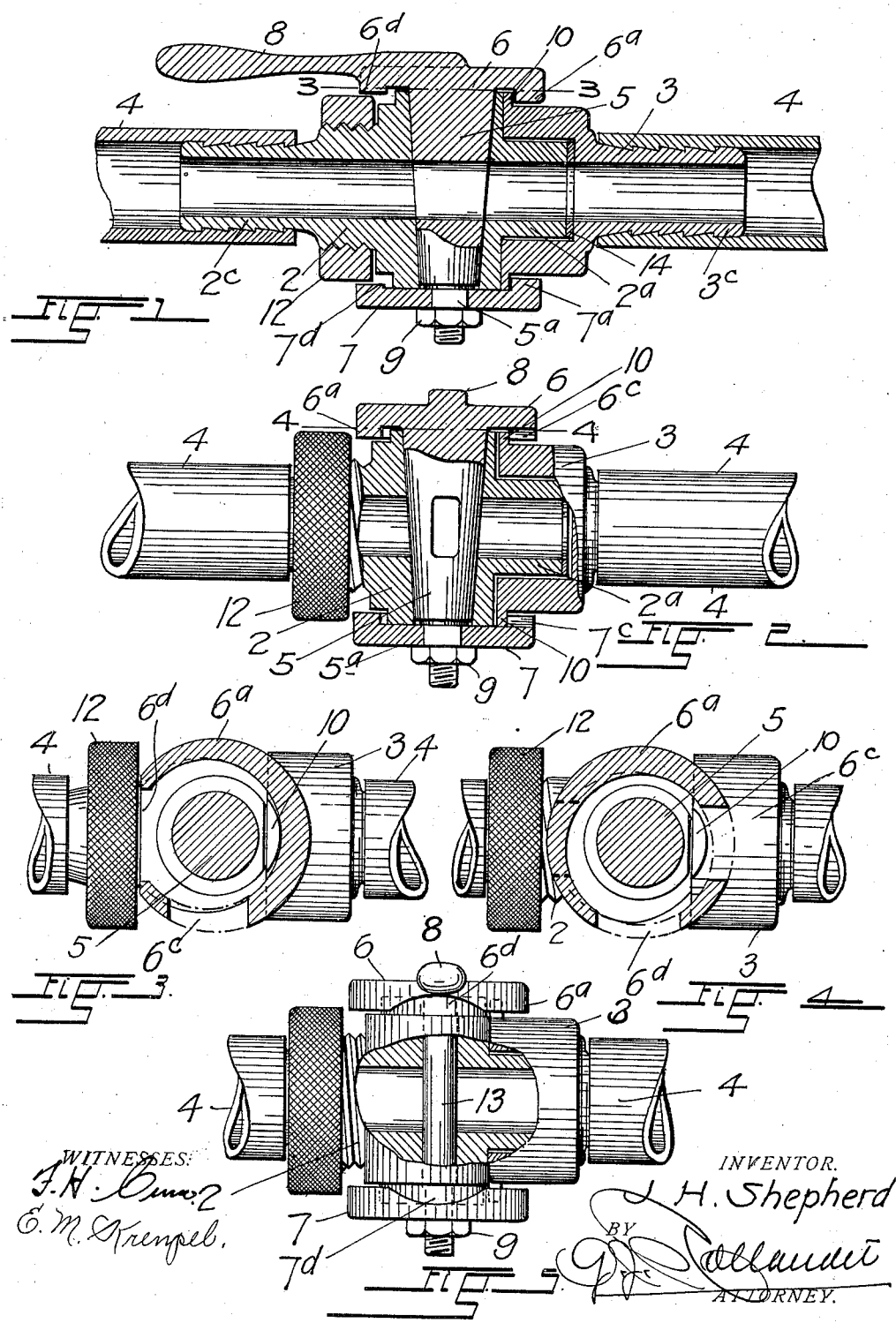
WITNESSES:
INVENTOR.
J. H. Shepherd
BY
ATTORNEY.

UNITED STATES PATENT OFFICE.

JAMES H. SHEPHERD, OF DENVER, COLORADO, ASSIGNOR OF ONE-HALF TO JOHN C. REAGAN, OF WHITEPINE, COLORADO.

PIPE-COUPLING.

1,038,669.  Specification of Letters Patent.  Patented Sept. 17, 1912.

Application filed September 30, 1910. Serial No. 584,741.

*To all whom it may concern:*

Be it known that I, JAMES H. SHEPHERD, a citizen of the United States of America, residing at Denver, in the county of Denver and State of Colorado, have invented certain new and useful Improvements in Pipe-Couplings, of which the following is a specification.

My invention relates to new and useful improvements in couplings of the type designed to adjustably join the ends of hose-sections, gas, steam, and water-pipes or other conduits, and its principal object is to provide a contrivance of simple construction by the use of which the joint between two pipe-sections may either be rendered impervious or be loosened to entirely separate said sections or to relieve the interposed packing substance from the pressure to which it is ordinarily subjected.

Another object of my invention resides in the provision of a readily adjustable means whereby the operative parts of the coupling may be locked in their adjusted position thus rendering the device applicable to conduits which by connection with power-driven machines are constantly subject to vibration.

In the preferred form of my invention, the coupling-means are associated with a valve which is in its closed position when the pipe-sections are separated, and which establishes communication between said sections at the same time that by adjustment of the parts, the joint between them is rendered fluid-tight.

In addition to the above named objects, my invention possesses the advantage that in case of long usage, the pipe-sections may be brought closer together to compensate for reduction in thickness of the resilient packing placed between them.

In the accompanying drawings, in the various views of which like parts are similarly designated, Figure 1 represents a longitudinal section through the coupling in its preferred form with the valve in the open position, Fig. 2, a similar view, partly in elevation, with the valve in the closed position, Fig. 3, a section taken along the line 3—3, Fig. 1, Fig. 4, a section taken along the line 4—4, Fig. 2, and Fig. 5, a sectional elevation showing a modified construction of the device.

Referring to the drawings by numerals, my improved coupling consists of two coöperative, axially bored members 2 and 3, one of which has a cylindrical socket for the reception of a correspondingly formed projection $2^a$ on the other. Both members terminate in exteriorly serrated plugs $2^c$ and $3^c$ for the attachment of hose-sections 4 and the male member 2 has a transverse, tapering passage in which a valve plug 5 is rotatably fitted. The plug 5 is provided at its extremities, with disk-shaped clamping-elements 6 and 7, one of which is preferably formed integral with the plug and with a laterally extending operating handle 8, while the other is removably applied upon a squared stem $5^a$ of the valve and held in place by means of a nut 9 screwed upon the threaded extension thereof.

The clamping elements 6 and 7 have upon their inner surfaces, annular flanges $6^a$ and $7^a$ the inner faces of which are formed eccentric with relation to the axis of the valve plug, and the female member 3 of the coupling has upon its circumferential surface two segmentally shaped cam-ribs 10, the outer, curved surfaces of which engage the eccentric faces of the respective clamping elements when the parts of the coupling are assembled. The two flanges $6^a$ and $7^a$ which are identical in construction, are each provided with two ports, disposed at right angles to each other, those designated in the drawings by the characters $6^c$ and $7^c$ being designed for the passage of the respective cam-ribs 10 when the members of the coupling are being assembled, while the others, indicated by the numerals $6^d$ and $7^d$ are provided for the admission of a circular, exteriorly milled nut 12, which is screwed upon a coöperatively threaded portion of the male coupling-member to lock the valve and the therewith connected clamping devices in their adjusted position.

While the lock-nut 12 is used principally to lock the valve in its open position, as shown in Figs. 1 and 3, it may also be used to lock it in its closed position by turning the valve-plug until the ports $6^c$ and $7^c$ are in register therewith.

In the modified form shown in Fig. 5, a slender connection 13, is substituted for the valve-plug 5 to connect the clamping elements 6 and 7, so that while the operation of the coupling remains the same, the bores of the members 2 and 3 and the therewith connected hose-sections remain at all times in uninterrupted communication. This form of my coupling is designed to join sections of hose or other conduits at points where the application of a valve would be either undesirable or unnecessary.

When the parts of my coupling are in the unlocked position as shown in Figs. 2 and 4, the two members 2 and 3 may be connected by passing the cam-ribs 10 on the female members through the ports 6ª and 7ª of the clamping elements 6 and 7 after which they are imperviously joined by turning the latter about their common axis which brings the eccentric faces of their flanges in contact with the convex surfaces of the ribs, thereby gradually drawing the two members toward each other and against the packing 14 placed between the end of the projection 5ª on the male member and the corresponding shoulder in the socket of its correlative.

While I have shown and described my improved coupling in the best form now known to me, it will be understood that the construction and arrangement of the various parts comprised therein may be varied within the spirit of the invention and that the coöperative coupling members may be constructed to connect conduits other than the flexible hose shown in the drawings, without affecting their function in the operation of the device.

Having thus described my invention what I claim and desire to secure by Letters-Patent is:—

1. A pipe-coupling comprising two members, clamping elements disposed at opposite sides of one of said members to rotate in unison about a common axis, and having flanges whose inner faces are eccentric to said axis, and a nut adjustable on said member, the other one of said members having cam-ribs to engage the said faces and the said flanges having recesses to admit said nut so as to lock the element against rotation.

2. A pipe-coupling comprising two members, clamping elements disposed at opposite sides of one of said members to rotate in unison about a common axis, and having flanges whose inner faces are eccentric to said axis, and a nut adjustable on said member, the other one of said members having cam-ribs to engage the said faces and the said flanges having ports for the passage of the said ribs and recesses for the admission of the said nut.

3. A pipe-coupling comprising two conduit-members, a valve having a rotary movement on one of said members to control the flow of fluid therethrough, the other member having a cam-rib, a flange on said valve, the inner surface of which is circular and eccentric to the axis of rotation of the valve to clampingly engage with said cam-rib when the two members are operatively connected, and the said flange having a port for the passage of said rib only, when the valve is in the position in which it obstructs the passage through the member on which it is mounted.

4. A pipe coupling comprising two conduit-members one of which has a cam-rib, a rotary clamping element on the other member, including a flange the inner surface of which is eccentric to the axis of rotation of said element, to clampingly engage said cam-rib when the members are operatively connected, and a nut adjustable on the other member and adapted to be brought in locking engagement with said element, when the latter is in the position to which it is adjusted to clampingly connect the said members.

5. A pipe coupling comprising two conduit-members one of which has a cam-rib, a rotary clamping element on the other member, including a flange the inner face of which is eccentric to the axis of rotation of said element, to clampingly engage said cam rib when the members are operatively connected, and a nut adjustable on the other member, the said flange having a recess to admit said nut whereby to lock said element against rotation when the latter is in the position to which it is adjusted to clampingly connect the said members.

In testimony whereof I affix my signature in presence of two witnesses.

JAMES H. SHEPHERD.

Witnesses:
G. J. ROLLANDET.
E. M. KREMPEL.

---

Copies of this patent may be obtained for five cents each, by addressing the "Commissioner of Patents, Washington, D. C."